United States Patent [19]

Ramirez

[11] 4,406,983
[45] Sep. 27, 1983

[54] ROTATIONAL MAGNETIC TRANSDUCER
[75] Inventor: Ciro N. Ramirez, Austin, Tex.
[73] Assignee: International Business Machines Corporation, Armonk, N.Y.
[21] Appl. No.: 335,480
[22] Filed: Dec. 29, 1981
[51] Int. Cl.³ .............................................. G05B 1/06
[52] U.S. Cl. .................................. 318/653; 324/174; 310/68 R; 310/154; 322/31
[58] Field of Search ............ 324/174; 310/68 R, 154, 310/171; 322/31; 318/653

[56] References Cited

U.S. PATENT DOCUMENTS

| | | | |
|---|---|---|---|
| 2,886,766 | 5/1959 | Gibson | 322/31 |
| 3,226,711 | 12/1965 | Lautzenhiser | 340/359 |
| 3,406,775 | 10/1968 | Magnuski | 324/174 X |
| 3,509,555 | 4/1970 | Loughlin | 340/347 |
| 3,688,306 | 8/1972 | Oishi et al. | 310/68 X |
| 3,805,161 | 4/1974 | Bayha et al. | 324/174 X |
| 3,970,935 | 7/1976 | Beery | 324/164 |
| 4,217,513 | 8/1980 | Kohzai et al. | 310/154 |

OTHER PUBLICATIONS

Jasik, Emil; "Sensing Speed for Control and Measurement;" Machine Design Magazine; 10/20/77; pp. 168–171.

*Primary Examiner*—B. Dobeck
*Attorney, Agent, or Firm*—J. B. Kraft

[57] ABSTRACT

A magnetic transducer is provided having a plurality of magnetic poles arranged annularly about an axis to form a stator coacting with a rotor which rotates about the same axis to induce changes in the magnetic forces between the poles. Each of the poles in the stator has a sense coil thereon for generating an electric output signal in response to the induced changes in flux. At least one pair of these magnetic poles have the same polarity and are positioned substantially 180° apart. The sense coils on each of the poles in this pair are connected in series so that the resulting output electrical signal from these coils would be cumulative.

7 Claims, 3 Drawing Figures

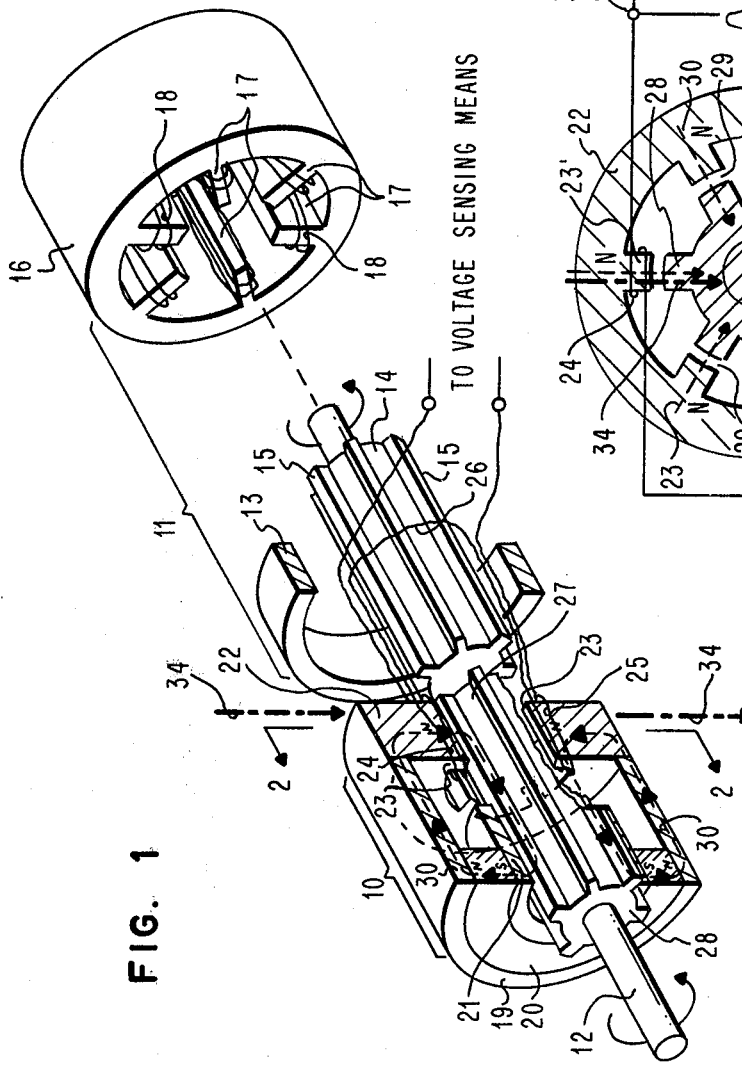
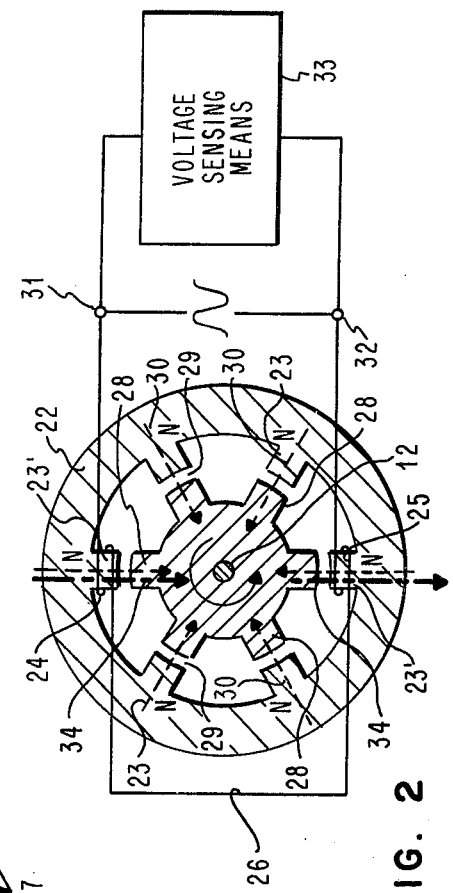
FIG. 1
FIG. 2

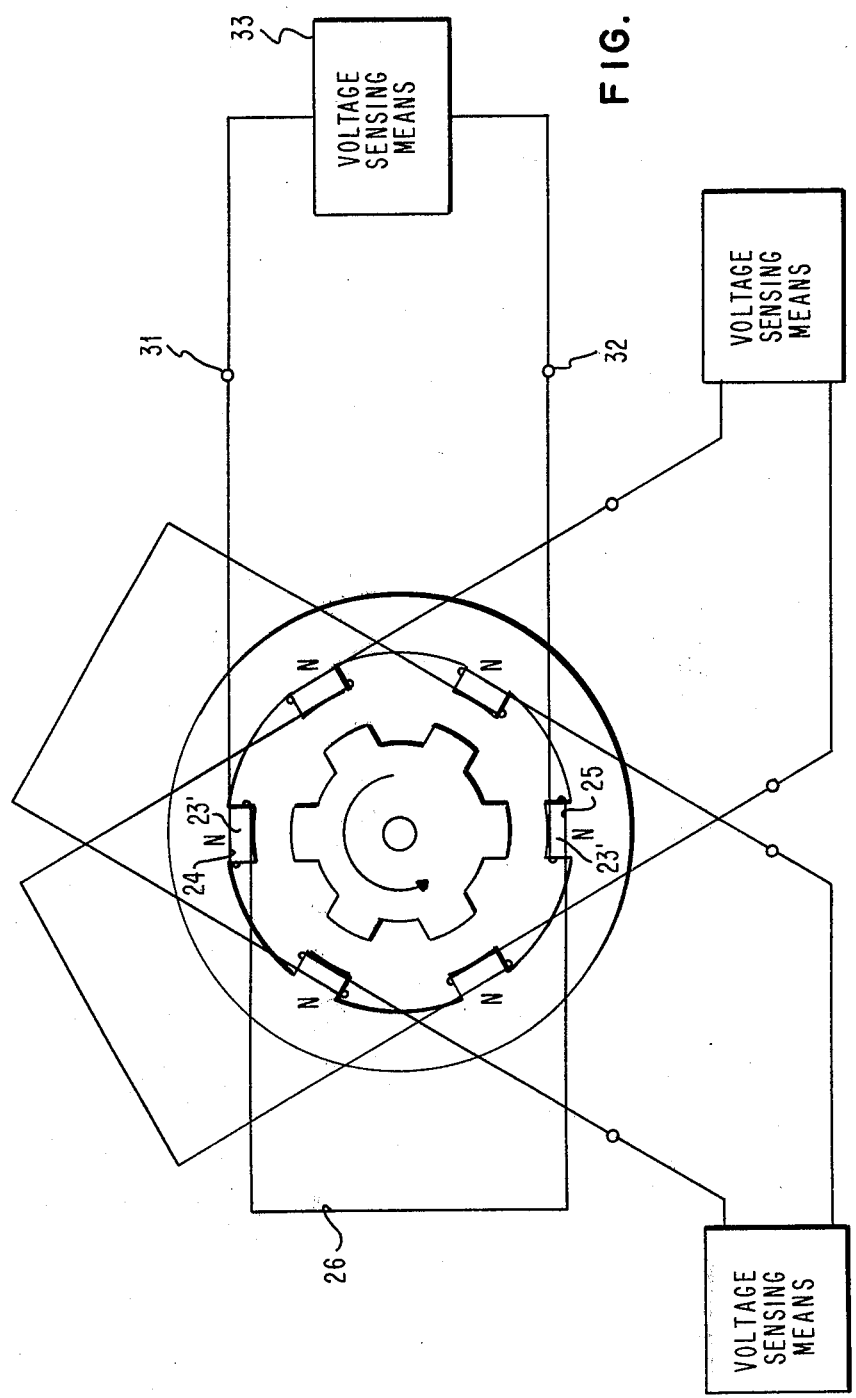

ROTATIONAL MAGNETIC TRANSDUCER

DESCRIPTION

Technical Field

The present invention relates to magnetic transducers.

Background Art

Magnetic transducers are non-contact transducers that convert mechanical motion into electrical energy. Typically, such transducers are used to determine the position and/or velocity of moving members. Rotational transducers are used extensively to determine such properties of rotating members such as shafts which are typically driven by motors. In such applications, magnetic transducers produce output electric signals directly related to rotational speed. Also, these transducers produce an electrical signal which is convertible to positional information in the manner well known in the art.

The background and operation of a typical rotational magnetic transducer may be found in the article entitled "Sensing Speed for Control and Measurement" appearing in *Machine Design Magazine*, Oct. 20, 1977, pp. 168–171. Some typical rotational transducers are described in U.S. Pat. Nos. 3,688,306, 3,226,711 and 3,509,555.

As the above art indicates, a new rapidly growing application for magnetic transducers is in microprocessor controlled machinery wherein transducers are used to obtain positional and velocity information with respect to rotating elements such as stators in stepper and servo motors. This sensed information is of course used by the controlling microprocessor to regulate the function of the equipment. Because of the exacting nature of many microprocessor controlled operations, there is a demand for rotational transducers of greater accuracy. However, in an operational environment involving equipment of considerable inductive properties, there is likely to be some stray magnetic flux in the vicinity of the sensing transducer. Such stray magnetic flux may interfere with and cause errors in readings of the sensing transducer.

The present invention provides magnetic transducer sensing apparatus in which the affect of stray transient magnetic flux on the sensed data is minimized. As will be hereinafter described in greater detail in the descriptions of the invention and preferred embodiment, the present invention achieves this result through the combination of paired stator poles of the same polarity 180° apart in combination with sense coils on each of the paired poles connected in series. U.S. Pat. No. 3,970,935 which is not related to the problem of stray magnetic flux appears to show paired magnetic poles of the same polarity 180° apart. However, the structure does not contain any sense coils on these poles.

DISCLOSURE OF THE INVENTION

The present invention provides a magnetic transducer sensing apparatus in which the affect of stray or transient magnetic flux on the sensed data is minimized. This is achieved by pairing the sensing coils on a corresponding pair of stator poles of the same polarity positioned substantially 180° apart. The sense coils are mounted on each of the pair of stator poles and connected in series. Because the stator poles have the same polarity and are substantially 180° apart, i.e., they face or oppose each other, the transient electrical signal in each of the respective coils resulting from the affects of stray or unwanted magnetic flux changes will oppose each other. Since the paired coils are connected in series, transient electrical signals will cancel each other out. Where the stator utilizes a plurality of such sense coils, the coils should be arranged in pairs connected in series supported upon stator poles or like polarity 180° apart. For best results, in such a plurality of pairs of coils, all of the poles in the stator would have the same selected magnetic polarity.

BRIEF DESCRIPTION OF THE DRAWINGS

Referring now to the drawings, wherein a preferred embodiment of the invention is illustrated, and wherein like reference numerals are used throughout to designate like parts;

FIG. 1 is a fragmentary diagrammatic sectioned view of apparatus in accordance with the present invention showing relationship of the magnetic transducer to the coaxial driving motor mounted on the same shaft.

FIG. 2 is a full cross-sectional diagrammatic view of the transducer of the present invention taken along lines 2—2 of FIG. 1.

FIG. 3 is the same view as FIG. 2 but of a variation in the embodiment of the invention wherein the transducer comprises three pairs of coils.

BEST MODE FOR CARRYING OUT THE INVENTION

With reference to FIG. 1, the apparatus shown comprises the magnetic transducer assembly 10 and motor assembly 11 both mounted about shaft 12 which is in turn rotatably mounted on a conventional frame not shown. The motor assembly 11 is representative of any conventional stepper motor or servo motor assembly which for purposes of the present illustration is shown to consist of motor rotor 14 having a plurality of regularly spaced pole projections 15 and affixed to axial shaft 12 and motor stator 16 which is shown broken out of the motor in the diagram of FIG. 1. A plurality of motor stator pole projections correspond to and are spaced from motor rotor pole projections 15. A spacer 13, which shown broken out of its position, made of electrically and magnetically insulative material separates the motor assembly 11 from the transducer assembly 10. A plurality of coils 18 are respectively mounted on stator pole projections 17. In the operation of the motor, in the conventional stepper or servo motor mode, coils 18 are activated in a selected time sequence pattern by conventional means not shown to coact with rotor poles 15 to cause the rotation of motor 14 and consequently shaft 12 to which it is affixed in the rotational direction shown by the arrow.

The operation and structure of the transducer of the present invention will now be described with respect to FIGS. 1 and 2. The assembly comprises a housing 19 of a ferromagnetic material, an annular permanent magnet 20 having the polarity shown in FIG. 1 and an inner annular supporting ring 21 which is also ferromagnetic. The assembly further includes stator plate 22 containing a plurality of inward pole projections 23 which may be more clearly shown with respect to FIG. 2. These pole projections 23 are spaced so that respective paired projections are opposite one another, i.e., 180° apart. At least one pair 23' of these pole projections which have an N polarity in the structure illustrated have mounted thereon a pair of sense coils 24 and 25. These pair of sense coils 24 and 25 are connected in series with each other through electrical conductor 26. Transducer 10 further contains a rotor 27 made of a ferromagnetic material and affixed to shaft 12. This rotor has a plurality of projections 28 which correspond in number and spacing to stator projections 23 but are disposed spaced from these stator pole projections 23 to provide gaps 29 selected in a conventional manner based upon the magnetic inductance characteristics of the transducer. With the structure thus arranged, permanent magnet 20 will produce a magnetic field through the stator assembly 10 having the path shown by the dashed arrows 30 in FIGS. 1 and 2.

With this arrangement, as motor assembly 11 causes the shaft 12 to rotate in the counterclockwise direction shown, rotor 27 in the transducer will in turn be rotated by shaft 12 in the same direction. Rotation of rotor 27 will cut across magnetic flux lines 30 to induce a change in the magnetic flux which will in turn result in the generation of an electric signal, i.e., the voltage level in coils 24 and 25 which are in series with one another. This will result in a fluctuating voltage output across output terminals 31 and 32 which may be sensed by any conventional voltage sensing means used in transducers described in the above referenced article and patents. Numeral 33 is used to designate such conventional voltage sensing means which are not shown in detail.

With the arrangement of coils and poles in the stator assembly as described with respect to FIGS. 1 and 2, the affects of any external transient undesirable magnetic fields will be minimized. For example, let us consider transient magnetic components having the direction shown by the dot-dashed arrows 34 in FIGS. 1 and 2. These will produce equal and opposite transient electrical signals respectively in each of paired sense coils 24 and 25. Since sense coils 24 and 25 are connected in series with each other, then the transient voltage signal respectively induced in each of the coils would be equal and opposite to that of the other. The two transient signals will in effect cancel each other out and have no affect on the signal being sensed.

While the invention has been described with respect to the preferred embodiment shown in FIGS. 1 and 2 of a transducer structure having one pair of sense coils, it should be understood that for various purposes in the rotational transducer technology as described in the above listed prior art, it may be desirable to utilize a greater plurality of sense coils.

U.S. Pat. No. 4,286,202 for example is directed to apparatus utilizing a variable reluctance transducer in connection with a stepper motor to sense at three rotational positions. In accordance with the present invention, the three paired coil transducer structure of FIG. 3 may be used for this purpose. The affect of transient and undesirable external magnetic fields may still be minimized by the structure shown in FIG. 3 wherein all of the stator poles are arranged in pairs, 180° apart, and each of the pair of poles has respectively mounted thereon a pair of sense coils connected in series in repetitive circuit arrangement of the basic coil circuit shown in FIG. 2.

While the invention has been particularly shown and described with reference to a preferred embodiment it will be understood by those skilled in the art that various other changes in form and detail may be made without departing from the spirit and scope of the invention.

I claim:

1. In a magnetic transducer having a plurality of magnetic poles arranged annularly about an axis to form a stator and a rotor rotating about said axis to induce changes in the magnetic flux between said poles, the improvement wherein,
   at least one pair of said stator poles having the same polarity are positioned substantially 180° apart, and
   each pole in said at least one pair has a sense coil thereon for generating an output electric signal in response to said induced changes in flux, said sense coils being connected in series with each other.

2. The magnetic transducer of claim 1 wherein all of the stator poles have the same polarity.

3. The magnetic transducer of claim 2 wherein all of the stator poles are arranged in pairs the poles of which are 180° apart.

4. The magnetic transducer of claim 3 wherein each pole in each pair has a sense coil thereon for generating an output electric signal in response to said induced changes in flux and said sense coils in each pair are connected in series.

5. The magnetic transducer of claim 1 wherein said transducer has associated therewith a motor having a motor stator coaxial with said transducer stator and a motor rotor rotating about said axis.

6. The apparatus of claim 5 further including
   a shaft along said axis, said motor rotor being affixed to said shaft whereby the rotation of said motor rotor rotates said shaft, and
   said transducer rotor also being affixed to said shaft whereby the rotation of said shaft rotates said transducer rotor.

7. The transducer of claim 2 wherein
   the stator comprises a plurality of said magnetic poles projecting from the inner periphery thereof, and
   the rotor has a corresponding plurality projections arranged about the outer periphery thereof with a selected gap maintained between stator and rotor peripheries.

* * * * *